United States Patent [19]
Lacey

[11] Patent Number: 5,197,264
[45] Date of Patent: Mar. 30, 1993

[54] UNIVERSAL FILAMENT TRIMMER CUTTING HEAD

[76] Inventor: Paul Lacey, Tarbell Hill Rd., Moriah, N.Y. 12960

[21] Appl. No.: 703,466

[22] Filed: May 21, 1991

[51] Int. Cl.$^5$ .................. A01D 34/73; A01D 50/00
[52] U.S. Cl. ..................... 56/12.1; 56/12.7; 30/276
[58] Field of Search .................. 56/12.1, 12.7; 30/276

[56] References Cited

U.S. PATENT DOCUMENTS

| | | | |
|---|---|---|---|
| 4,062,115 | 12/1977 | Lee | 30/276 |
| 4,068,376 | 1/1978 | Briar | 30/276 |
| 4,068,377 | 1/1978 | Kimmel | 30/276 |
| 4,118,865 | 10/1978 | Jaeymo | 30/276 |
| 4,282,653 | 8/1981 | Comer | 30/276 |
| 4,411,069 | 10/1983 | Close | 30/276 |
| 4,550,498 | 11/1985 | Oliver | 56/12.7 X |
| 4,571,831 | 2/1986 | White | 30/276 |
| 4,685,279 | 8/1987 | Gallett | 56/12.7 |
| 4,756,146 | 7/1988 | Rouse | 56/12.7 |
| 4,905,465 | 3/1990 | Jones et al. | 30/276 X |
| 4,916,866 | 4/1990 | Nakamura | 56/12.7 |

Primary Examiner—Terry Lee Melius
Attorney, Agent, or Firm—Kevin R. Kepner

[57] ABSTRACT

A one piece, durable, maintenance free, filament trimmer cutting head which is easily adaptable to virtually any power weedeater. The cylindrical design ensures ease of manufacture and results in a well balanced cutting head. The design further provides for ease of filament replacement and allows the usage of standard filament from bulk spools.

10 Claims, 3 Drawing Sheets

UNIVERSAL FILAMENT TRIMMER CUTTING HEAD

BACKGROUND OF THE INVENTION

This invention relates to vegetative trimmers of the type attached to a hand held power unit which utilize a high speed rotating filament or string as the cutting mechanism. The present invention comprises a universal fixed filament cutting head device for attachment to any variety of hand held power units.

There are currently known many types and styles of the filament trimmers or "weedeaters" as they are generically referred to. These trimmers basically fall into two main categories. One category consists of powered trimmers which have a spool of cutting filament contained within the cutting head and usually provide some means of automatically advancing the filament as the working ends are broken or splittered from use. The second category contains what would be called fixed line trimmers in which a predetermined length of filament is somehow retained in the cutting head and manually replaced when broken or otherwise used up.

Cutting heads which fit into category one above are described in U.S. Pat. Nos. 4,068,377 to Kimmel et al; 4,282,653 to Comer et ano.; 4,411,069 to Close; and 4,916,886 to Nakamura et ano. Trimmers of this type all provide for some method of automatic advancement of the filament medium as use dictates. Additionally, each of the above descibed cutting heads is made up of numerous parts and are usually specific for use on one type or brand of power unit. Furthermore, these type heads are subject to becoming jammed or clogged with grass or weed trimmings thereby adversely affecting their ease of operation.

Fixed element cutting heads which fall under category two above are described in U.S. Pat. Nos. 4,068,376 to Briar; 4,118,865 to Jaeymo et ano.; 4,571,831 to White; 4,685,279 to Gullett; and 4,756,146 to Rouse. These trimmers all use some sort of fixed length of fixed filament, and, in the case of the Jaeymo and Briar patents necessitate the use of a specifically shaped or specifically manufactured cutting elements. As in the category one cutting heads each of the above heads consist of multiple parts and are not universally adaptable to various power units. The complexity of the heads also increases the cost of manufacture of these units.

The present invention is intended to meet all of the shortcomings of the above described art. It is a one piece universally adaptable cutting head which can be manufactured and easily configured to fit virtually any power unit. It allows for the use of various diameters of cutting filament which can be used from a standard bulk spool. The filament can be replaced in seconds without any disassembly or removal of the cutting head from the unit and multiple filaments adapted for a particular usage can be used. Further, the configuration and construction provide for a well balanced durable tool.

DETAILED DESCRIPTION THE INVENTION

Figure 1:
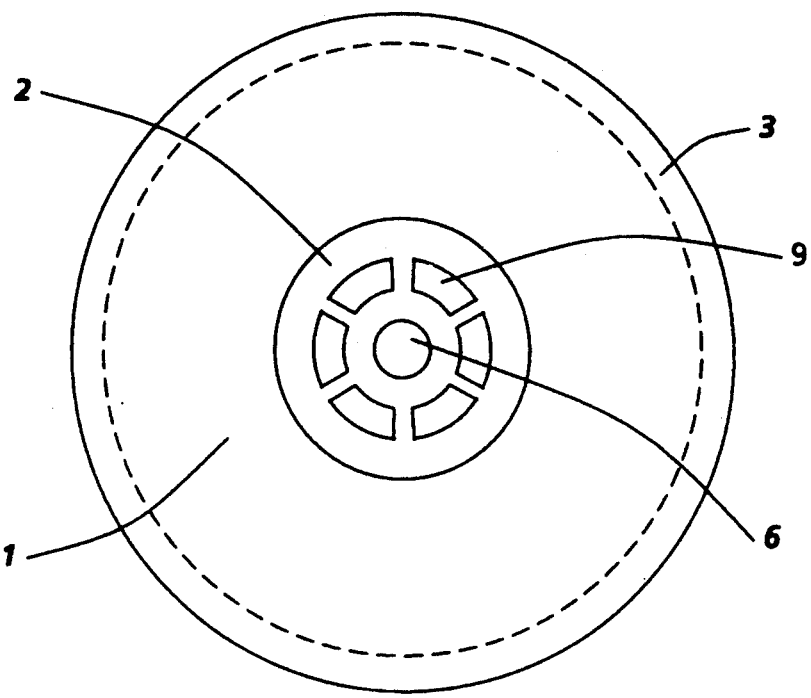
FIG. 1. is a top plan view of one embodiment of the invention.
Figure 2:
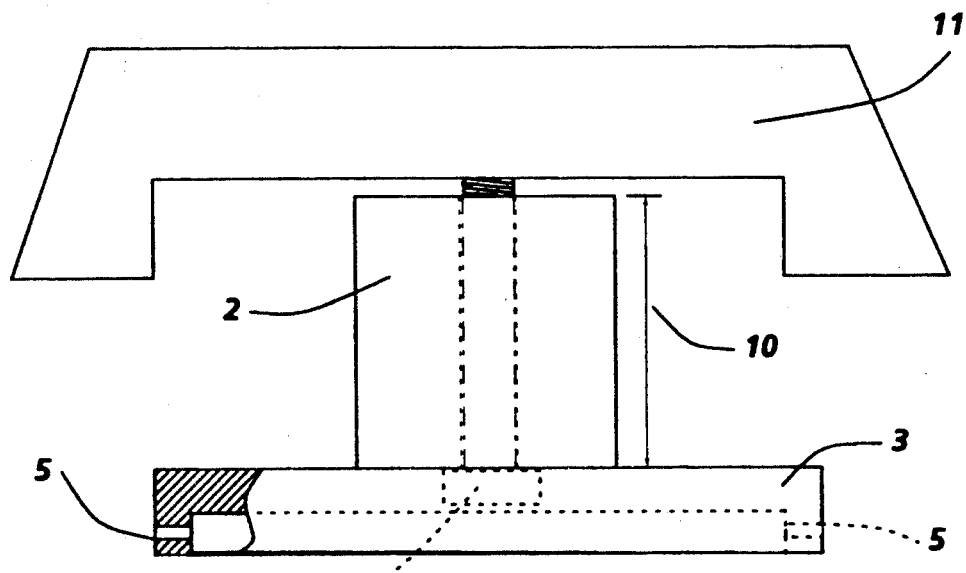
FIG. 2. is a side elevation of the invention.
Figure 3:
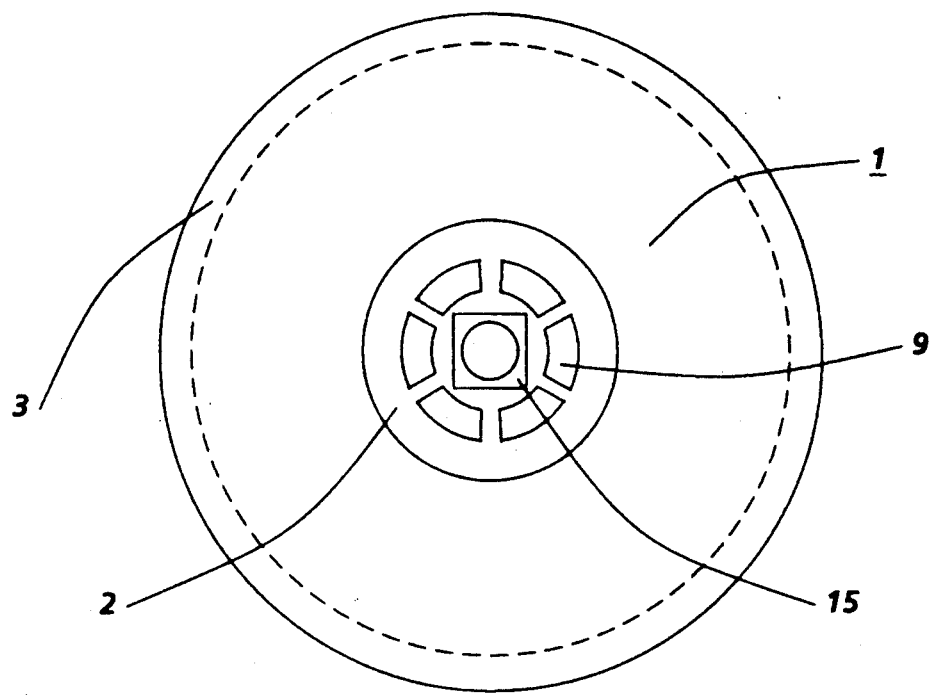
FIG. 3. is a top plan view of a second embodiment of the invention.
Figure 4:
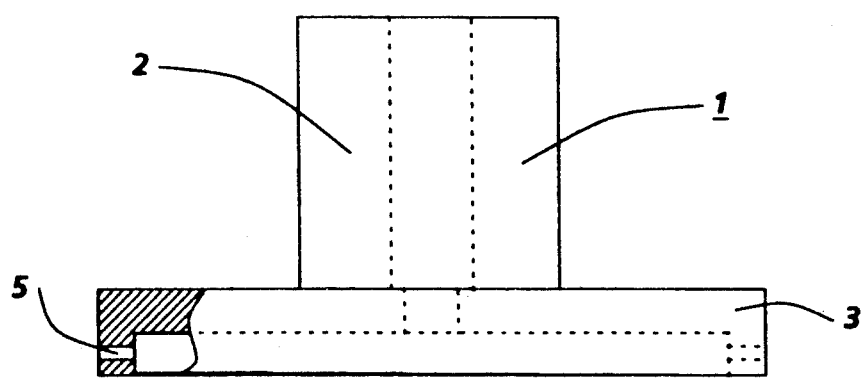
FIG. 4. is a side elevation of a second embodiment of the invention.
Figure 5:
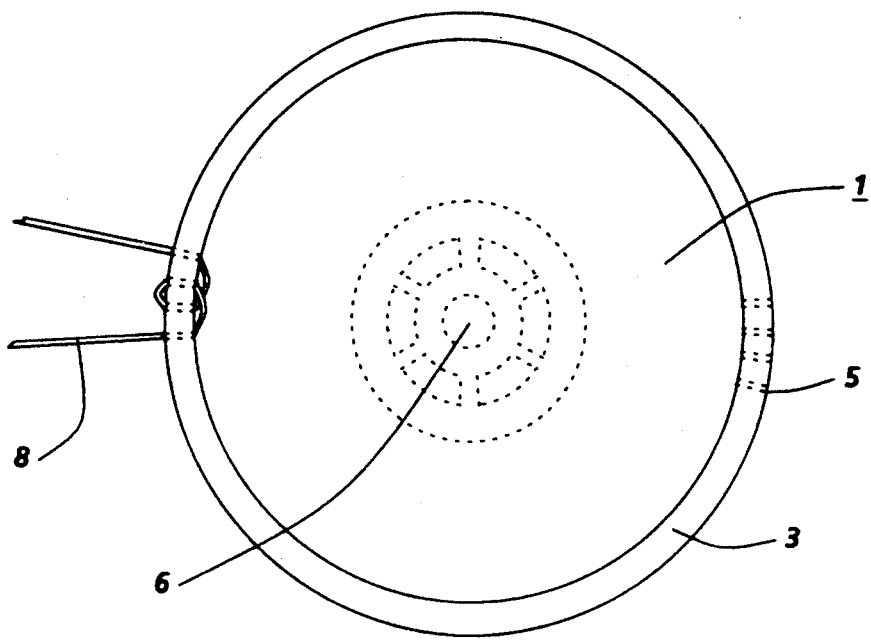
FIG. 5. is a bottom plan view of the invention showing the installation of a cutting filament.
Figures 6, 7:
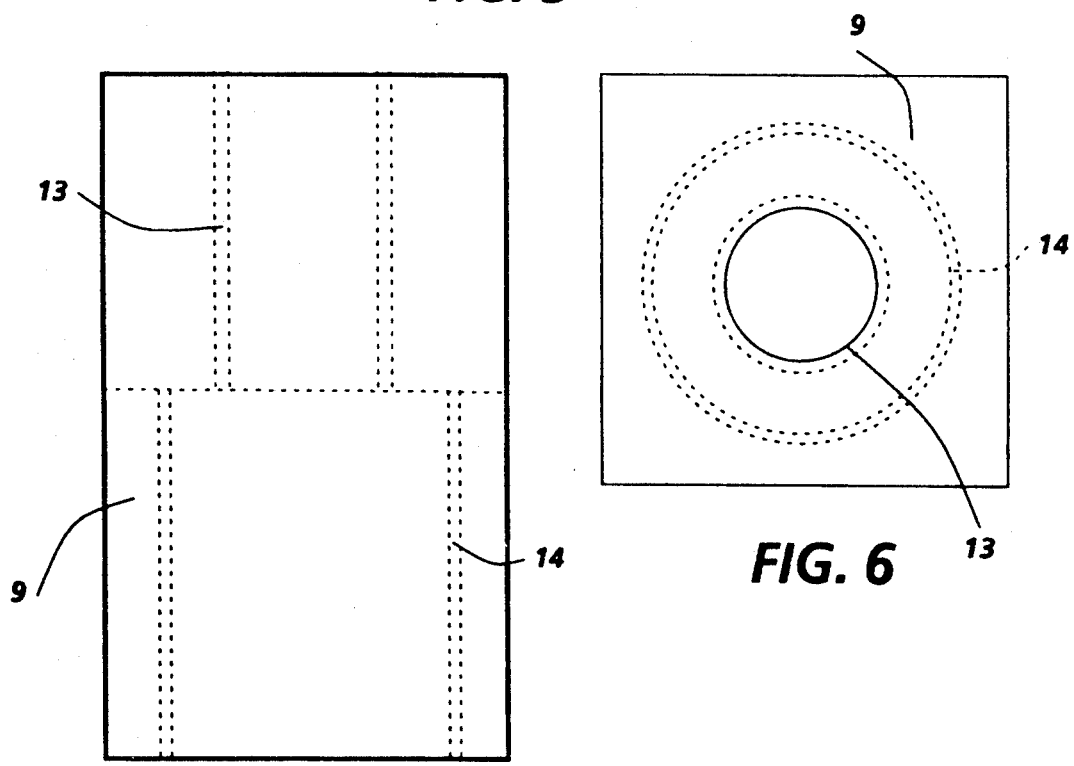
FIG. 6. is an enlarged top plan view of the arbor.
FIG. 7. is an enlarged side elevation of the arbor.

Referring specifically to the drawings herein the cutting head 1 is a one piece device ideally molded, which consists of a mounting cylindical portion 2 and a larger diameter, hollowed, filament retaining section 3. The cutting head 1 is mounted to the power unit 11 by means of a bolt device 12 inserted through the mounting block hole 6. There are voids 9 in the mounting portion 2 which reduce the overall weight of the head 1.

A second embodiment utilizes a non-round arbor 9 recessed into a void 15 into the mounting block to provide positive drive engagement. The use of the arbor also allows for a greator adaptability of the cutting head 1. The arbor is secured to the head by means of a bolt inserted through the lower portion of the head and tightened into the lower threads 13 in the arbor 9.

By providing arbors 9 with varying sized upper portion threads 14 the arbor 9 can be utilized to adapt to either male threaded drive units or by using an adapter stud, to female threaded drive units.

The cutting line 8 is attached by looping the line 8 in a double loop configuration preferred embodiment, four holes 5 which are formed in the lower wall section 4 of the mounting portion 2 of the head. The holes 5 are aligned radially from the center of the head 1.

In use the cutting filament 8 is inserted in the mounting holes 5, usually utilizing two filaments 8 mounted substantially 180° from each other on the radius of the lower portion 2 of the head 1. By forming different sized sets of holes 5 at locations substantially 180° from each other on the perimeter of the head 1, various sized cutting filaments are able to be utilized with a single cutting head.

Additionally, by varying the length 10 and the size of the mounting hole 6 of the mounting portion 2 of the head 1, the head 1 is adaptable to virtually any power unit 11. This in combination with the ability to utilize various diameters of cutting filament allows the use of this cutting head in numerous applications.

The embodiments described herein have been for illustrative purposes only. It is obvious to those skilled in the art that various modifications and adaptations are easily contemplated. Accordingly the disclosure herein is not intended as a limitation but merely as a generic and descriptive device.

What is claimed:

1. A one piece cutting head for vegetation comprising:
   a solid dislike body having two planar surfaces;
   a drive mounting portion of said head with means, attached to the first planar surface, for positively engaging and securing said head to a drive means; and
   a filament mounting portion, on the second planar surface, comprising a wall extending downwardly from the second planar surface around the periphery of the solid dislike body and substantially perpendicular to said second planar surface with filament attachment means comprising an even plurality of holes in said wall.

2. A device as in claim 1 wherein said even plurality of holes equals four and wherein opposite ends of a cutting filament are threaded through two adjacent holes from the outer periphery of said filament mounting portion and the first end of said filament then threaded from the inner portion of aid filament mounting portion through the hole adjacent to the hole previously threaded with the second end of said filament and said second end of said filament then threaded from said inner portion of said filament mounting portion through the hole adjacent to the hole initially threaded with said first end of said filament so as to cross said ends of said filament in said inner portion of said filament mounting portion and so that said filament ends extended beyond the outer periphery of said filament mounting portion.

3. A device as in claim 1 wherein said even plurality of holes equals four and wherein opposite ends of a cutting filament are threaded through two non-adjacent holes from the outer periphery of said filament mounting portion and the first end of said filament then threaded from the inner portion of said filament mounting portion through the hole adjacent to the hole previously threaded with said first end of said filament and the second end of said filament then threaded from said inner portion of said filament mounting portion through the hole adjacent to the hole initially threaded with said second end of said filament so that said filament ends extend beyond the outer periphery of said filament mounting portion.

4. A device as in claim 1 wherein said even plurality of holes equals four and wherein opposite ends of cutting filament are threaded through two non-adjacent holes from the outer periphery of said filament mounting portion and the first end of said filament then threaded from the inner portion of said filament mounting portion through the hole adjacent to both the hole previously threaded with said first end of said filament and the hole previously threaded with the second end of said filament and said second end of said filament then threaded from said inner portion of said filament mounting portion through the hole adjacent to the hole initially threaded with said first end of said filament so as to cross said ends of said filament in said inner portion of said filament mounting portion and so that said filament ends extended beyond the outer periphery of said filament mounting portion.

5. A device as in claim 1 wherein said means for positively engaging and securing said head to said drive means comprises a non round arbor adaptively fit to a recess in said drive mounting portion of said head opposite said filament mounting portion, said arbor having threaded portions at each end, the first threaded portion being adapted to engage said drive means and the second threaded portion being adapted to engage an attachment means securing said head to said arbor.

6. A device as in claim 5 wherein said even plurality of holes equals four and wherein opposite ends of a cutting filament are threaded through two adjacent holes from the outer periphery of said filament mounting portion and the first end of said filament then threaded from the inner portion of said filament mounting portion through the hole adjacent to the hole previously threaded with the second end of said filament and said second end of said filament then threaded from said inner portion of said filament mounting portion through the hole adjacent to the hole initially threaded with said first end of said filament so as to cross said ends of said filament in said inner portion of said filament mounting portion and so that said filament ends extend beyond the outer periphery of said filament mounting portion.

7. A device as in claim 5 wherein said even plurality of holes equals four and wherein opposite ends of a cutting filament are threaded through two non-adjacent holes from the outer periphery of said filament mounting portion and the first end of said filament then threaded from the inner portion of said filament mounting portion through the hole adjacent to the hole previously threaded with said first end of said filament and the second end of said filament then threaded from said inner portion of said filament mounting portion through the hole adjacent to the hole initially threaded with said second end of said filament so that said filament ends extend beyond the outer periphery of said filament mounting portion.

8. A device as in claim 5 wherein said even plurality of holes equals four and wherein opposite ends of a cutting filament are threaded through two non-adjacent holes from the outer periphery of said filament mounting portion and the first end of said filament then threaded from the inner portion of said filament mounting portion through the hole adjacent to both the hole previously threaded with said first end of said filament and the hole previously threaded with the second end of said filament and said second end of said filament then threaded from said inner portion of said filament mounting portion through the hole adjacent to the hole initially threaded with said first end of said filament so as to cross said ends of said filament in said inner portion of said filament mounting portion and so that said filament ends extended beyond the outer periphery of said filament mounting portion.

9. The cutting head of claim 1 further comprising:
two even pluralities of a first sized hole located approximately 180 degrees apart along said wall; and
two even pluralities of a second sized hole located approximately 180 degrees apart along said wall in a location different from said even pluralities of first sized holes so as to allow for the use of different sized filaments.

10. The cutting head of claim 5 further comprising:
two even pluralities of a first sized hole located approximately 180 degrees apart along said wall; and
two even pluralities of a second sized hole located approximately 180 degrees apart along said wall in a location different from said even pluralities of first sized holes so as to allow for the use of different sized filaments.

* * * * *